United States Patent
Varadaraj

(10) Patent No.: US 8,317,905 B2
(45) Date of Patent: Nov. 27, 2012

(54) PARTICULATE REMOVAL FROM GAS STREAMS

(75) Inventor: Ramesh Varadaraj, Flemington, NJ (US)

(73) Assignee: ExxonMobil Research and Engineering Company, Annandale, NJ (US)

(*) Notice: Subject to any disclaimer, the term of this patent is extended or adjusted under 35 U.S.C. 154(b) by 485 days.

(21) Appl. No.: 12/586,833

(22) Filed: Sep. 29, 2009

(65) Prior Publication Data

US 2010/0083834 A1  Apr. 8, 2010

Related U.S. Application Data

(60) Provisional application No. 61/195,155, filed on Oct. 3, 2008.

(51) Int. Cl.
*B01D 45/00* (2006.01)

(52) U.S. Cl. ........... 95/268; 95/267; 95/272; 95/271; 95/36; 95/202; 55/342; 55/343; 55/347; 55/523; 55/DIG. 25; 96/121

(58) Field of Classification Search .......... 55/342, 55/343, 347, DIG. 25, 523; 95/268, 267, 95/272, 271, 36, 202; 96/121
See application file for complete search history.

(56) References Cited

U.S. PATENT DOCUMENTS

| | | | |
|---|---|---|---|
| 3,745,751 A * | 7/1973 | Zey et al. .................... 422/161 |
| 3,755,122 A | 8/1973 | Melcher et al. |
| 3,815,337 A * | 6/1974 | Lenane ........................ 96/386 |
| 3,822,531 A * | 7/1974 | Wisnewski et al. ........... 55/315 |
| 3,888,768 A * | 6/1975 | Graybill ........................ 210/223 |
| 4,000,995 A * | 1/1977 | Morris ............................ 55/282 |
| 4,070,162 A * | 1/1978 | Kober et al. .................... 95/60 |
| 4,180,391 A * | 12/1979 | Perry et al. ..................... 55/324 |
| 4,344,920 A * | 8/1982 | Isserlis ......................... 422/169 |
| 4,378,976 A * | 4/1983 | Rush .............................. 95/29 |
| 4,568,365 A * | 2/1986 | Metcalfe et al. ............... 95/267 |
| 4,874,402 A | 10/1989 | Vogel |
| 4,969,931 A | 11/1990 | Wu et al. |
| 5,017,196 A | 5/1991 | Dewitz |
| 5,516,974 A | 5/1996 | Sasae et al. |
| 6,019,809 A * | 2/2000 | Kahlbaugh et al. ........... 55/486 |
| 6,240,859 B1 | 6/2001 | Jones, Jr. |
| 6,589,314 B1 * | 7/2003 | Page et al. ...................... 95/32 |
| 6,746,636 B2 | 6/2004 | Meyer |
| 6,997,118 B2 | 2/2006 | Chandran et al. |
| 7,032,410 B2 * | 4/2006 | Barratt et al. ................. 62/473 |
| 7,077,887 B2 * | 7/2006 | Blake et al. ................... 95/267 |
| 2003/0106467 A1 | 6/2003 | Jones, Jr. |
| 2003/0108470 A1 | 6/2003 | Spencer et al. |
| 2004/0144287 A1 | 7/2004 | Tardif et al. |
| 2006/0090651 A1 | 5/2006 | Liu et al. |
| 2007/0142208 A1 | 6/2007 | Addiego et al. |

FOREIGN PATENT DOCUMENTS

| | | |
|---|---|---|
| WO | WO 94/21965 | 9/1994 |
| WO | WO 95/29326 | 11/1995 |
| WO | WO 2004/028731 | 4/2004 |

* cited by examiner

*Primary Examiner* — Jason M Greene
*Assistant Examiner* — Dung H Bui
(74) *Attorney, Agent, or Firm* — Bruce M. Bordelon

(57) ABSTRACT

Fine, solid particles in a gas stream, especially fly ash particles in the hot gas stream from a coal/coke-utilizing synthesis gas unit, are agglomerated by passage through a gas flow matrix element having a body with confined gas flow channels which bring the particles into close proximity to one another in an environment of low turbulence; a rough surface on the gas flow passages provides surface induction to promote agglomeration of the particles. The larger, agglomerated particles may then be removed from the gas stream by inertial separators such as cyclones.

17 Claims, 3 Drawing Sheets

PARTICULATE REMOVAL FROM GAS STREAMS

This application claims the benefit of U.S. Provisional Application No. 61/195,155 filed Oct. 3, 2008.

FIELD OF THE INVENTION

The present invention relates to the removal of particulates from gas streams and in particular to fly ash removal, especially from synthesis gas generated by gasification of coal or coke.

BACKGROUND OF THE INVENTION

The removal of suspended particulates from gas streams is a continuing problem in a number of fields particularly in combustion technologies, that is, processes in which a fuel is combusted to generate energy and, in so doing, generates an exhaust stream of combustion products which contain suspended particulates. The problem may be encountered with large internal combination engines, for example, diesels, furnaces and other heaters and may be present itself regardless of whether the fuel is liquid or solid, e.g. oil or coal. One particular area where this problem is troublesome is with combustion equipment using coal as a fuel, particularly high-ash bituminous coals. Thus, coal-burning power stations, heating plants come into question as well as synthesis gas plants producing synthesis gas from coal or coke.

The suspended particles emitted from combustion units burning solid fuels such as coal or coke, are generally referred to as fly ash; this is usually defined as the solid particulate matter emitted as suspended residue with a particle size no greater than 200 microns ($\mu$) with the majority of the particle sizes on a mass basis being below 45$\mu$. An indication of the fineness of the ash particles is to determine the particle size distribution. For example, the mass percentage below 10$\mu$ or the mean particle diameter can be determined. Thus a fly ash might have the following distribution (on a mass basis): 0.3-2% below 1 $\mu$, 30-70% finer than 10$\mu$, 0.5-7% above 100$\mu$ and 0-2% above 200$\mu$. However, the same fly ash on a numerical basis may have 40-60% of the total number of particles on the order of particle sizes less than 1$\mu$.

Current technology using candle filters for fly ash removal in a coal gasification plant is estimated to cost about $61,000,000 (U.S. dollars) in capital expenditure for a 3000 ton per day coal plant producing about 600 tons per day of hydrogen. Candle filters using ceramic filter elements offer good corrosion resistance and high temperature operability but mechanical integrity is a key limitation as filter breakage results in high operation costs and down time. Cyclones are a lower cost, higher reliability option but suffer from the limitation that small particulates under 5$\mu$ are difficult to remove. With typically some 30% or more of the ash being below 10$\mu$, as noted above, cyclone separation is obviously likely to be less than complete.

One potential solution proposed for dealing with the problem in gasification plants has been to seed the gas stream with fly ash seeds to aggregate the ash into larger particle size agglomerates which can then be removed in the conventional manner with cyclones. The practical difficulty of injecting the seeds into the high pressure, high temperature stream from the gasifier has, however, reportedly made this method unattractive.

An alternative approach proposed to deal with the fly ash problem is scrubbing: the fly ash particles can be removed from the gas in a water scrubber and by the recycling the aqueous ash suspension to the hot gas stream, the fines are returned to the system. The problem created by doing this is that the fines increasingly accumulate in the recycle loop formed by the cyclone(s) and water scrubber if the suspended ash particles are not discharged from the purification system. Injection of the aqueous suspension into the hot gas before the heat exchanger(s) upstream from the cyclones or between or into the heat exchanger(s) is normally advantageous since the suspension evaporates more readily and the gas is slightly pre-cooled but the heat exchanger(s) then tend to become fouled by the fine ash particles, causing a lower degree of heat transfer so that the outlet temperature of the gas from the heat exchanger(s) increases and the cyclone may become damaged. In addition, fly ash deposits formed in the exchanger(s) may occasionally come loose causing a sudden change in temperature for the heat exchange tubes with possible undesirable consequences in operation of the unit.

U.S. Pat. No. 4,874,402 (Vogel) describes a method for cleaning the gases formed in a coal-utilizing synthesis gas plant by agglomerating fly ash particles to form bigger particles which are more readily separated in the cyclone(s). The agglomeration is carried out by various means including mechanical or electrostatic agglomeration with best results obtained by using an adhesive agent such as water glass (water/sodium silicate) which has the further advantage that it reduces the leachability of the agglomerated particles. While this method may be effective it would be desirable to develop a method for promoting the removal of fly ash particles which does not rely upon the use of any additives or additional consumables; this is now capable of achievement by the use of the present invention.

SUMMARY OF THE INVENTION

We have discovered as shown herein that it is possible to agglomerate the particles of fly ash suspended in a gas stream by wholly mechanical means, making use of two principles, channeling and surface induction. The agglomerated particles may then be separated from the gas stream using inertial separators such as cyclones.

According to the present invention, solid particles in a gas stream, especially the fly ash particles in the hot gas stream from a coal/coke-utilizing synthesis gas unit, are agglomerated by passage through a gas flow matrix element which is a body having confined gas flow channels which bring the particles into close proximity to one another in an environment of low turbulence; a rough surface on the gas flow passages provides surface induction to promotes agglomeration of the particles. The resulting larger, agglomerated fly ash particles generated by the current process may then be removed from the gas stream by inertial separators such as cyclones.

Purification of gas streams containing suspended fine particulates is carried out, according to the invention, in a gas purification device which comprises (i) a gas flow matrix element having confined parallel aligned flow channels each having a gas inlet at one end and a gas flow outlet at the opposed end, and (ii) an inertial particle separator such as a cyclone which is connected in gas flow communication with the gas outlets which is capable of separating the agglomerated particles by inertial separation. The gas flow matrix element is preferably a porous ceramic material.

In a particular embodiment, the gas purification device is used to remove fine fly ash particles suspended in the synthesis gas from a coal/coke gasifier.

DETAILED DESCRIPTION OF THE INVENTION

The agglomeration techniques and methods of the present invention can be widely applicable to the removal of particulates from gas streams. The invention herein may therefore be used for treating vehicle exhausts, particularly of heavy oil diesel engines such as low-speed marine diesels, as well as gas emissions from heavy fuel oil combustion plants containing particulates of soot and unburned hydrocarbons. However, in a preferred embodiment of the present invention is a process for treating the fine fly ash found in the flue gas streams generated from coal-fired power plants and a process that is particularly useful in treating the fine fly ash found in the synthesis gas (syngas) streams from coal or coke gasification plants.

The aggregation of particulates in a gas stream and the resulting size of the aggregate is influenced by the size of the interacting particulates (radius; $R_1$, $R_2$), the distance of approach between the particulates (D), the turbulence experienced by the particulates ($\Gamma$) the Hamaker (Van der Waals) interaction parameter between the particulates ($A_{p,p}$) and the Hamaker interaction parameter between the particulate and the surrounding gas($A_{p,g}$). The expression below describes the dependence of aggregate size to these parameters assuming the gas-particle interaction to be negligible:

$$\text{Aggregate Size} \propto \frac{A_{pp}(R_1 R_2)}{D\Gamma(R_1 + R_2)} \quad [1]$$

It follows from an analysis of the flow and dynamics of particulates in a gas stream that the key to effective aggregation is to bring the particulates in close proximity to one another (reduce D) in a low turbulence environment (reduce $\Gamma$), as well as to induce interaction between the particulates ($A_{p,p}$). This can be achieved by channeling the particulate-laden gas stream through a gas flow channel that has a rough interior surface which brings the particulates into close proximity to each other (decreasing D and $\Gamma$) in a low turbulent environment which, together with the roughness of the interior of the channel providing surface induction for aggregation, leads to aggregation of particulates.

Figure 1:
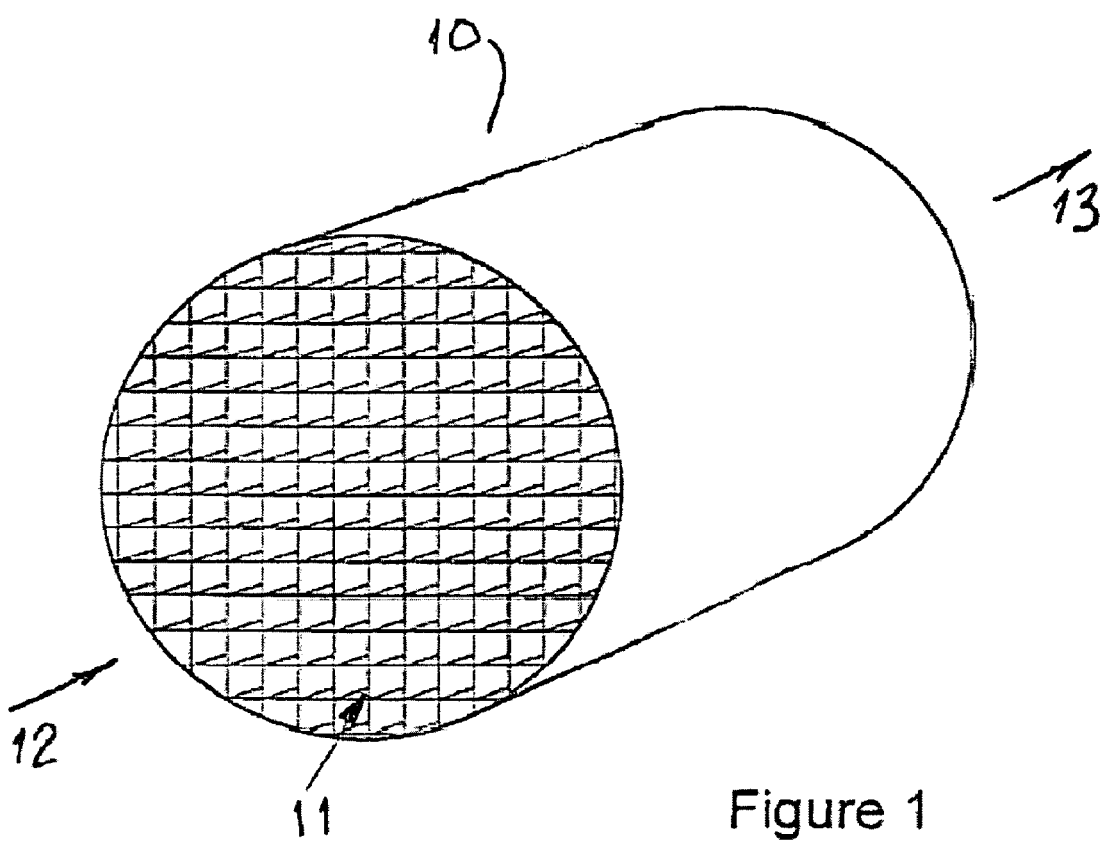
FIG. 1 herein is a representation of an embodiment of a ceramic monolith useful in the aggregation process of the present invention.

The channeling of the gas stream is preferably brought about by the use of a gas flow matrix element comprising a number of axially-aligned gas flow channels, usually circular in cross-section although other cross-sections such as triangular, rectangular, square, hexagonal are also convenient for forming channels in a compact configuration. The matrix element is preferably a porous ceramic monolith although, depending on the service requirements, other materials including metals such as steel or silicon carbide may be utilized. Unglazed monolithic ceramic elements are likely to be the most useful and economical in high temperature environments such as those prevailing in a syngas unit in which exit temperatures from the gasifier are typically as high as 800° C. The term "monolith" is used here to mean that the flow passages are contained in a unitary body but it does not require that only one such body may be used: the required total gas flow area may be assembled from a number of monoliths either stacked contiguously to one another or in separate processing containers or manifolds, e.g. cans. FIG. 1 shows such a ceramic monolith (10) with parallel, aligned gas flow passages (11) which are square in cross-section and which are arranged in the monolith in a compact packing honeycomb arrangement. The gas flow with fine particles enters the passages on one side (12) of the monolith and a product gas with aggregated particles exits from the other, opposed side (13) at the opposite ends of the flow passages (11).

Figure 2:
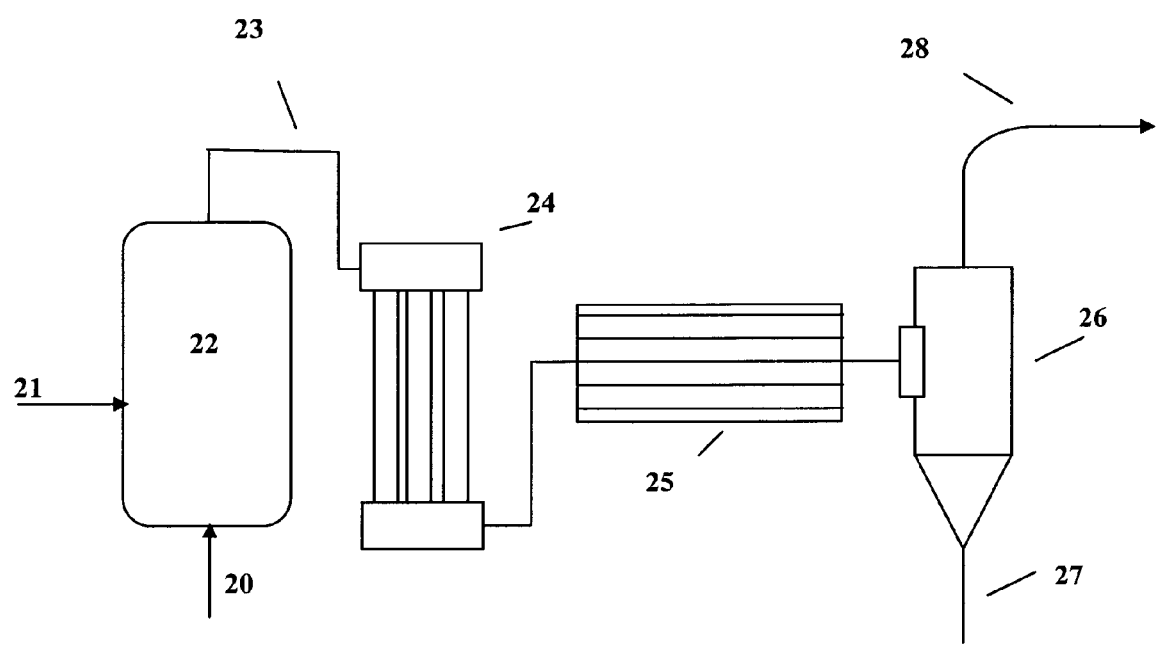
FIG. 2 herein is a simplified schematic of an embodiment of the fly ash removal process of the present invention adapted to use with a coal-utilizing synthesis gas generation unit.

FIG. 2 shows a much simplified from the manner in which the process of the present invention is to be incorporated into a typical coal gasifier process. A hydrocarbon-containing material comprised of coal of coal by-products (20) enters the gasifier unit (22) and is mixed with an oxygen-containing stream (21) producing a product synthesis gas (23). Due to the high temperatures of the gasification reaction, the product synthesis gas is typically sent to a heat exchanger (24) for recovery of waste process heat and to cool the product gases. Following the heat exchanger, an aggregation device (25) using restricted flow channels is connected in line to receive the cooled product gases. The product gas stream containing the agglomerated particles is then conducted to a mechanical cyclone (26) wherein the agglomerated fly ash particles, which have now been increased to sufficient mass, can be separated in the cyclone device. The agglomerated fly ash particles are then collected from the cyclone dipleg (27) with the final purified gas stream passed through the cyclone outlet line (28) for subsequent processing.

The dimensions of the gas flow passages in the aggregation device are selected to minimize turbulence at the selected gas flow rate which itself determined by the size of the gas-generating unit and the size of the agglomeration device. The length and cross-section of the flow passages are interrelated in that a relatively longer flow passage allows laminar flow to become established following the initial turbulence created at the inlet; the cross-sectional area is therefore selected according to the desired gas flow rate at the working temperature of the gas stream; the length of the flow passages is then set to maintain low turbulent conditions, preferably with a Reynolds number below 2,000 or even lower, e.g. 1,500. The diameter of circular channels will normally be in the range of 0.1 to 10 millimeters (mm), more typically from 1 to 5 mm. Length of the channels will typically be from 10 centimeters (cm) to 100 meters (m). Wherein the channels are not circular in cross section (as well as when the channels are circular in cross section), the equivalent diameter, $D_{equiv}$, of the channels should be determined by the formula:

$$D_{equiv} = \frac{4 \times (\text{cross-sectional area of the channel})}{(\text{perimeter of the channel})} \quad [2]$$

In this case, $D_{equiv}$ will preferably be in the range of 0.1 to 10 millimeters (mm), more preferably from 1 to 5 mm.

The material of which the surfaces of the flow channels are formed is preferably selected to have a surface roughness which will induce surface induction for the aggregation of the particles. The roughness preferably extends over the entire wall of the gas flow passage but may also be provided in surface domains of controlled, e.g. increased roughness which may have any desired shape and size and may be continuous domains or discontinuous patterns such as dot patterns or bands extending on the circumference surface of the monolith, either in the axial or transverse directions or even both e.g. as a helix extending along the channel as well as around it.

The desired roughness may be provided in a number of ways. First, the flow passages may be formed in an inherently rough material such as unglazed ceramic; a second possibility is to use a material which does not have the necessary degree of roughness in itself but to apply a material which will provide the roughness to the interior walls of the gas flow passages (i.e. the walls in contact with the flowing gas). The roughness may suitably be constituted by surface parts extending upwardly from the remaining surface, such as refractory particles bound to and optionally embedded in the surface.

The particles used to impart the roughness to the surfaces will typically be particles of the same ceramic material as the monolith, but it is also possible to use particles of a different material. Refractory particles which are resistant to the temperatures encountered in the gas streams from gasifiers include particles of silicon carbide, cordierite, corundum, alumina, silicon nitride. The use of the same ceramic material as the monolith will however facilitate production of the agglomerating device by allowing a "green" monolith body to be converted to the final, fired form with the refractory particles fired onto the gas flow passages formed in the monolith. The particles used for this purpose will normally have a size in the range of 10 to 1000 microns. The ceramic particles are preferably applied to the "green" ceramic honeycomb monolith body in such a manner that they become bound to and optionally embedded in the surface, extending upwards from the surface to give the desired degree of surface roughness. The particle carrying monolith body is then fired to convert it to a refractory body with the particles ceramically bound to the surface.

A suitable way of binding the particles to the surface is by first applying a wash coat of a slurry containing fine ceramic particles to the surface, and then applying coarser particles to the slurry layer, e.g. by sprinkling. In the later heat treatment, the slurry will be converted to bind the larger particles to the surface. Improved binding of the particles to the surface may be obtained by applying an extra layer of slurry on top of the particles. The particles may also be pressed into the surface of the green monolith body before firing when they will become permanently bonded to the matrix. Combinations of these treatments may also be used.

Mechanical treatments such as with a punch, abrasive application, e.g. sand blasting, or by scribing, may also be used to provide flow channels of the requisite roughness. These methods may be usefully employed to confer the desired roughness on metal surfaces, e.g. in vehicle exhaust treatment devices, where mechanical strength is important.

Another alternative way of providing the requisite degree of surface roughness is to provide a textured internal surface to the flow passage. A suitable technique for texturing the surface of a passage is by the use of a radiation power beam, usually an electron beam of a laser beam. Such techniques have been found to be effective for the creation of surface protrusions in various morphologies, for example, in the form of nubs, ridges or protrusions of various forms, e.g. quasi-cylindrical (columnar), pyramidal, mushroom-shaped, quasi-spherical, quasi-ovoidal, or in the creation of depressions in the surface either alone or in conjunction with adjacent surface protrusions. Surface protrusions and depressions may be formed in this way up to about 2 mm high and 200 microns wide with heights in the range of 10 to 1000 microns generally being suitable for the present purposes. The formation of texturings by the use of power beams is applicable to a range of materials including metals, polymers, ceramics and glasses. If this technique is used to impart the desired degree of roughness to the gas flow channels, either the entire matrix element or the internal surface of the channels will be of a material amenable to this treatment. When formed in metal, these protrusions are referred to as "metal fingers" and may be formed typically 10 to 1000 microns in length to provide a requisite degree of roughness to the channel.

The power beam texturing process uses a power beam such as an electron beam and/or a laser beam. The power beam is focused and deflected rapidly over the substrate surface by a series of electromagnetic coils or lenses. When the power beam comes into contact with the substrate, the substrate material melts and vaporizes. The vapor pressure of the molten material causes the materials to be expelled from the substrate provided that the beam does not fully penetrate the substrate. This evaporated material is deposited around the perimeter of the initial contact point of the beam with substrate in order to form surface features (e.g., protrusion). Displacement of the material may be facilitated by the use of gas assistance, e.g. when using a laser beam. The size, shape and distribution of the surface features can be varied in a controlled manner.

The power beam surface modification technique is described in WO2004/028731 entitled "Workpiece Surface Modification", to which reference is made for a description of the technique.

A material which is suitable for use in making the ceramic monoliths is the one commonly used in diesel filters or catalyst carriers, the low thermal expansion material cordierite, a magnesium aluminum silicate ($Mg_2Al_4Si_5O_{18}$) that often includes low levels of iron and other impurities. Cordierite, besides having a high melting point around 1260° C. and a low coefficient of thermal expansion is also resistant to thermal shock and has an acceptably high mechanical strength for the present purpose.

The root mean square (rms) surface roughness will typically be at least 10 microns (rms) and more normally in the range of 20-10,000 microns (rms), preferably 50-500 microns (rms) and, optimally, 100 to 1,000 microns (rms).

The agglomeration or aggregation of the smaller fly ash particles, especially those below 10μ in size, forms larger particle agglomerates with an overall mass distribution of particle sizes of 10μ or larger. At least 50% (by number) of the smaller particles (less than 10μ) are aggregated into the larger particles and in favorable cases, significantly greater proportions (by number) of particles will be so agglomerated, for example, at least 75% or more, going as high as 80% or more than 90%, as reported below. Once agglomerated into larger particles, the larger agglomerates can be more readily separated by cyclones or other inertial separation techniques in which a change in the direction of the gas stream causes the agglomerated particles to pursue a different path from the gas as a result of their greater density so that they can be effectively collected and removed. An example of an inertial separator is described in EP0577895. In most cases, cyclones will be used as they impose the lowest degree of resistance to gas flow coupled with the ability to handle the large volumes of gas from a large gasifier or combustion plant. In this way, the ash particles originally smaller than 10μ are removed from the gas stream after being agglomerated into larger particles typically larger than 20μ and in favorable cases, larger than 35μ or even larger than 45μ. Agglomeration of the ash into particles larger than 10μ permits effective use of cyclones and other inertial separators to remove the ash particles.

EXAMPLE

A test rig was built comprising three components: (i) a sample chamber which houses a fly ash sample, (ii) a detachable aggregation chamber and (iii) an analysis chamber housing a LASENTEC™ in-line video monitor for on-line real time imaging of the fly ash stream from the aggregation chamber. The three components were connected in a straight line with a flow line approximately 5 cm. in diameter leading from the sample chamber through the aggregation chamber and then past the video monitor. The ash was collected after passing the monitor.

A multi channel rough interior surface ceramic monolith with straight through channels was used in the aggregation chamber. The channels were 1 mm×1 mm square shape with 20 to 30 micron size bumps in the interior of each channel. Ceramic monoliths of this type can be purchased from CeraMem™ Corporation.

In a typical experiment, fly ash obtained from the Eddy Stone coal combustion power plant unit in Pennsylvania was used in the experiment. The ash was loaded into the sample chamber and nitrogen gas introduced over the fly ash at 2500 cc/min flow rate. The fluidized fly ash passes through the aggregation chamber into the analysis chamber where the video monitor digitally captures real time on-line images of the fly ash stream. With time the fly ash particulates were observed to adhere to the monitor window. Typically, runs were made for 1 to 3 minute durations. The captured images were analyzed using the Lasentec™ Blob analysis software and size distributions were determined.

Figure 3:
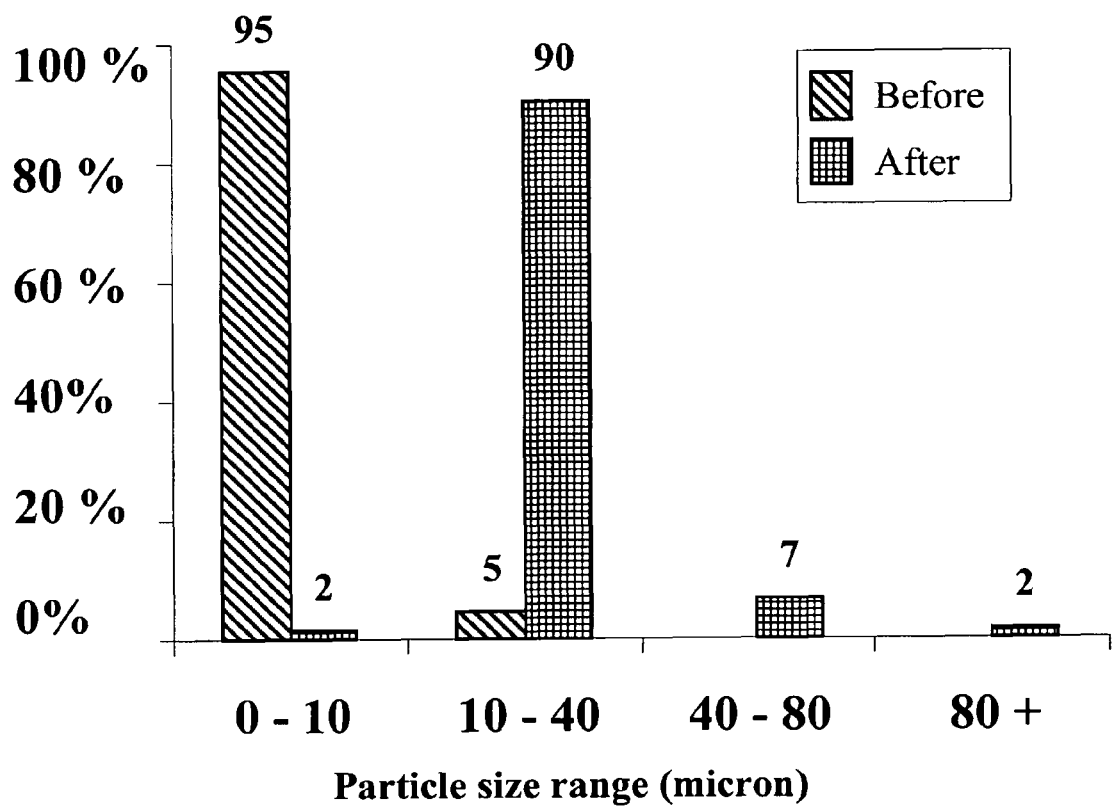
FIG. 3 herein is a graph showing the results of fly ash aggregation experiments reported in the Experiment section herein illustrating the benefits of the present invention for increasing fly ash particle sizes.

The particle size distribution determined from the captured video frames is shown in FIG. 3 which shows that introduction of the multi channel ceramic in the path of the fly ash resulted in aggregation of substantially all (98%) of the particles of fly ash with sizes less than 10μ into particles larger than 10μ with a significant portion being aggregated into particles above 40μ. These results indicate that a multi-channel ceramic with rough interior surfaces can be effective in aggregating small fly ash particulates at low gas flow rates.

What is claimed is:

1. A method of removing suspended particles from a flowing gas stream which comprises passing the gas stream containing the suspended particles through confined parallel aligned flow channels in a gas flow matrix element to agglomerate the particles having a particle size less than 10 microns into particle agglomerates having a particle size of at least 10 microns; and removing the particle agglomerates from the gas stream by inertial separation wherein the walls of the flow channels in contact with the gas stream have a surface roughness of from 20 to 500 microns (rms).

2. A method according to claim 1 in which the flow channels are formed in a porous ceramic monolith gas flow matrix element.

3. A method according to claim 1 in which the gas flow matrix element is comprised of flow channels with a $D_{equiv}$ of from 0.1 to 10 millimeters.

4. A method according to claim 1 in which up to 70% by mass of the particles in the gas stream have a particle size less than 10 microns, at least 75% of these particles being agglomerated into particle agglomerates having a particle size of at least 10 microns.

5. A method according to claim 4 in which at least 90% of the particles having an overall size less than 10 microns are agglomerated into particle agglomerates having a particle size of at least 10 microns.

6. A method according to claim 1 in which the gas stream comprises the product gas stream from a coal gas gasifier and the particles comprise fly ash particles.

7. A method according to claim 6 in which up to 70% by mass of the fly ash particles in the gas stream have a particle size less than 10 microns, at least 75% of these particles being agglomerated into particle agglomerates having a particle size of at least 10 microns.

8. A method of removing fly ash particles from a flowing gas stream at elevated temperature, which comprises (i) passing the flowing gas stream containing suspended fly ash particles through confined parallel aligned flow channels formed in a porous ceramic gas flow matrix element to agglomerate fly ash particles having a particle size less than 10 microns into particle agglomerates having a particle size of at least 10 microns and (ii) removing the particle agglomerates from the gas stream by inertial separation; wherein the walls of the flow channels in contact with the gas stream have a surface roughness of from 20 to 500 microns (rms).

9. A method according to claim 8 in which the inertial separation is made by means of a cyclone.

10. A method according to claim 8 in which up to 70% by mass of the fly ash particles in the gas stream have a particle size less than 10 microns, at least 75% of these particles being agglomerated into the particle agglomerates having a particle size of at least 10 microns.

11. A method according to claim 8 in which the porous ceramic gas flow matrix is comprised of flow channels with a $D_{equiv}$ of from 0.1 to 10 millimeters.

12. A method according to claim 8 in which the Reynolds number of the gas stream while in the flow channels is less than 2,500.

13. A gas purification device for removing suspended fine solid particles in a flowing gas stream which comprises (i) a gas flow matrix element having confined parallel aligned flow channels each having a gas inlet at one end and a gas flow outlet at the opposed end, and (ii) an inertial particle separator connected in gas flow communication with the gas outlets; wherein the walls of the flow channels in contact with the gas stream have a surface roughness of from 20 to 500 microns (rms).

14. A device according to claim 13 in which the gas flow channels in the gas flow matrix element are formed in a porous ceramic material.

15. A device according to claim 13 in which the gas flow matrix element is comprised of flow channels with a $D_{equiv}$ of from 0.1 to 10 millimeters.

16. A synthesis gas purification device for removing suspended fine fly ash particles from the synthesis gas from a coal/coke gasifier which comprises (i) a gas flow matrix element having confined parallel aligned flow channels each having a gas inlet at one end and a gas flow outlet at the opposed end, and (ii) an inertial particle separator connected in gas flow communication with the gas outlets of the gas flow matrix element; wherein the walls of the flow channels in contact with the synthesis gas have a surface roughness of from 20 to 500 microns (rms).

17. A device according to claim 16 in which the inertial particle separator comprises a cyclone.

* * * * *